(12) United States Patent
Farmer et al.

(10) Patent No.: US 8,137,602 B2
(45) Date of Patent: Mar. 20, 2012

(54) METHOD FOR MANUFACTURING COMPOSITE COMPONENTS

(75) Inventors: Benjamin Lionel Farmer, Bristol (GB); Marcel Buckley, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 12/513,272

(22) PCT Filed: Nov. 21, 2007

(86) PCT No.: PCT/GB2007/050702
§ 371 (c)(1),
(2), (4) Date: May 1, 2009

(87) PCT Pub. No.: WO2008/065446
PCT Pub. Date: Jun. 5, 2008

(65) Prior Publication Data
US 2010/0068527 A1    Mar. 18, 2010

(30) Foreign Application Priority Data
Nov. 29, 2006   (GB) .................................. 0623738.2

(51) Int. Cl.
*B32B 3/26* (2006.01)
(52) U.S. Cl. ..................... 264/134; 264/271.1
(58) Field of Classification Search .................. 264/134, 264/271.1
See application file for complete search history.

(56) References Cited

U.S. PATENT DOCUMENTS

| | | | |
|---|---|---|---|
| 2003/0132543 A1* | 7/2003 | Gardner | 264/85 |
| 2005/0176329 A1* | 8/2005 | Olry et al. | 442/388 |
| 2006/0166003 A1* | 7/2006 | Khabashesku et al. | 428/413 |
| 2007/0128960 A1* | 6/2007 | Ghasemi Nejhad et al. | 442/59 |
| 2007/0298669 A1 | 12/2007 | Barrera et al. | |

FOREIGN PATENT DOCUMENTS

| | | |
|---|---|---|
| EP | 1502727 A1 | 2/2005 |
| WO | 2004/025003 A2 | 3/2004 |
| WO | 2005/012171 A2 | 2/2005 |
| WO | 2006080936 A1 | 8/2006 |

OTHER PUBLICATIONS

Dictionary.com definition of "Drain".*
E. T. Thostenson et al., "Carbon nanotube/carbon fiber hybride multiscale composites," Journal of Applied Physics, vol. 91, No. 9, May 1, 2002, pp. 6034-6037.
ISR for PCT/GB2007/050702 dated Apr. 4, 2008.

* cited by examiner

*Primary Examiner* — Yogendra Gupta
*Assistant Examiner* — Amjad Abraham
(74) *Attorney, Agent, or Firm* — Lowe, Hauptman, Ham & Berner, LLP

(57) ABSTRACT

A method of fabricating a composite component comprising the steps of: loading a preform into a component forming environment, filling the environment with a solvent carrying a catalyst material in solution or suspension, draining this liquid from the mould thereby leaving a residue of the catalyst material on the perform and/or the interior surface of the forming environment, heating the forming environment and subsequently or concurrently introducing a carbonaceous gas under such conditions as to grow a carbon nanotube structure on the preform and/or the forming environment surfaces, removing the carbonaceous gas, and introducing a liquid resin material into the forming environment whereby the resin disperses through the preform and carbon nanotube structure thereby forming the finished composite component once the resin is cured or set.

10 Claims, 2 Drawing Sheets

METHOD FOR MANUFACTURING COMPOSITE COMPONENTS

RELATED APPLICATIONS

Figure 1:
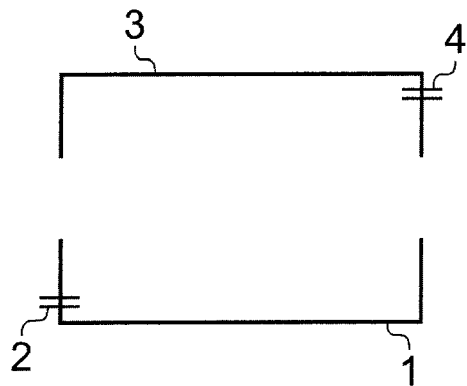

The present application is based on International Application Number PCT/GB2007/050702 filed Nov. 21, 2007, and claims priority from British Application Number 0623738.2 filed Nov. 29, 2006, the disclosures of which are hereby incorporated by reference herein in their entirety.

FIELD OF THE INVENTION

The present invention relates to improved methods for forming composite structures. More particularly, although not exclusively, the invention relates to improved methods of resin-transfer moulding composite structures in order to increase the toughness and hence damage tolerance of the resulting article. The invention also relates to an improved composite structure formed by the aforementioned method.

BACKGROUND TO THE INVENTION

Liquid composite moulding for processes such as resin transfer moulding hold great industrial interest for manufactures of complex thick composite structures. At present, one significant drawback to the widespread introduction of such structures into advanced engineering applications is the low toughness of the resin system suited to these processes. This disadvantage is particularly acute in the domain of civil aerospace where the material properties of composites are extremely demanding.

The low viscosity required for liquid composite moulding precludes the use of thermoplastic toughening agents. This results in composite structures with a low toughness, and therefore limited damage tolerant performance.

One solution to this problem is the augmentation of conventional composite structures with carbon nanotubes (CNTs). It has been demonstrated in the literature that secondary carbon nanotubes can be grown on the surfaces of primary carbon fibres.

If the carbon nanotubes can be grown with an appropriate concentration relative to each other, self-alignment can be obtained as a result of the van der Waals interactions between the tubes.

Thus an aligned CNT structure can be formed between the fibres. However, no process currently exists for the practical fabrication of composite components exhibiting such a structure.

SUMMARY OF THE INVENTION

In one aspect, the invention provides for a method of fabricating a composite component comprising the steps of: loading a preform into a component forming environment, filling the environment with a solvent carrying a catalyst material in solution or suspension, draining this liquid from the mould thereby leaving a residue of the catalyst material on the perform and/or the interior surface of the forming environment, heating the forming environment and subsequently or concurrently introducing a carbonaceous gas under such conditions as to grow a carbon nanotube structure on the preform and/or the forming environment surfaces, removing the carbonaceous gas, and introducing a liquid resin material into the forming environment whereby the resin disperses through the preform and carbon nanotube structure thereby forming the finished composite component once the resin is cured or set.

Preferably the forming environment is a mould, a vacuum bag resin-transfer mould assembly or other constraining environment which is capable of being used for a resin-transfer moulding process. In a preferred embodiment, the forming environment is a metallic mould.

Preferably, the catalyst is a metallic catalyst material in solution or suspension.

Preferably the preform is a carbon-fibre perform structure such as a dry-fibre preform or any similar type of preform that allows the carbon nanotube structure to be constituted or deposited within the interstitial structure of the carbon fibre preform structure or on the outside surface of the carbon fibres.

Preferably the carbonaceous gas is removed by flushing the mould with an inert gas.

Preferably, the resin is introduced into the perform carbon nanotube structure by means of conventional resin transfer molding techniques or similar.

DETAILED DESCRIPTION OF AN EMBODIMENT OF THE INVENTION

Figure 2:
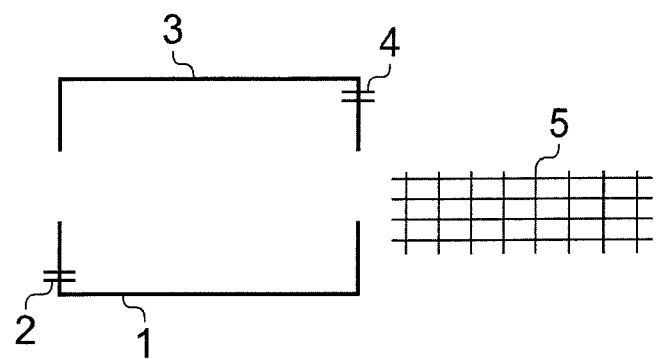
Figure 3:
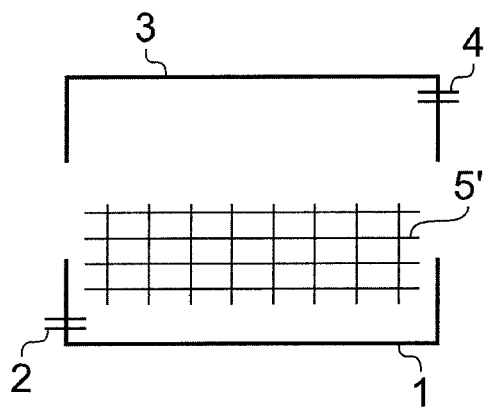
Figure 4:
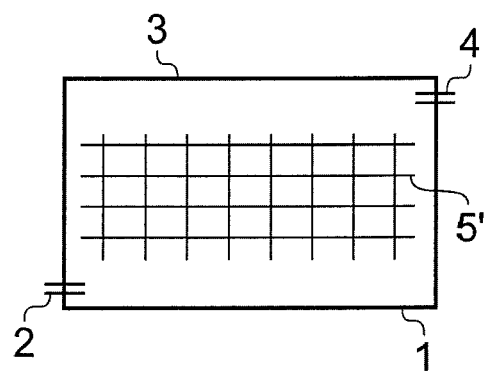
Figure 5:
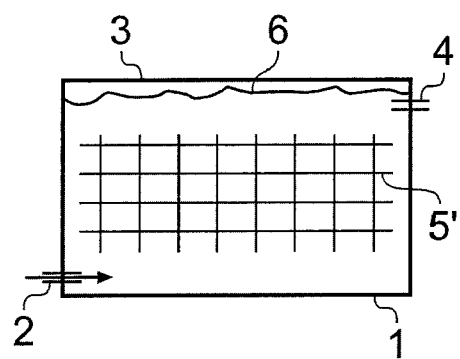
Figure 6:
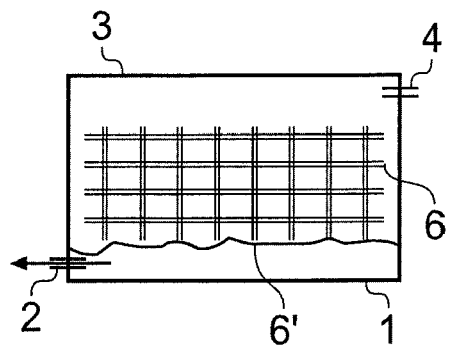
Figure 7:
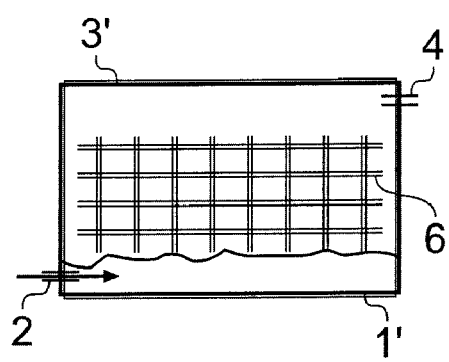
Figure 8:
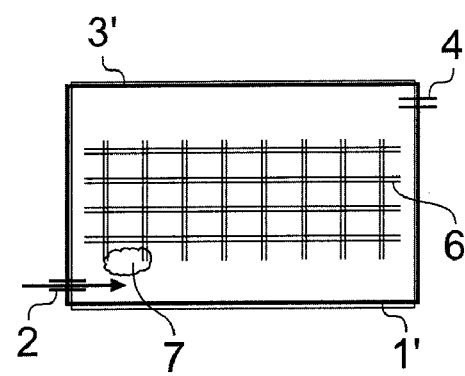
Figure 9:
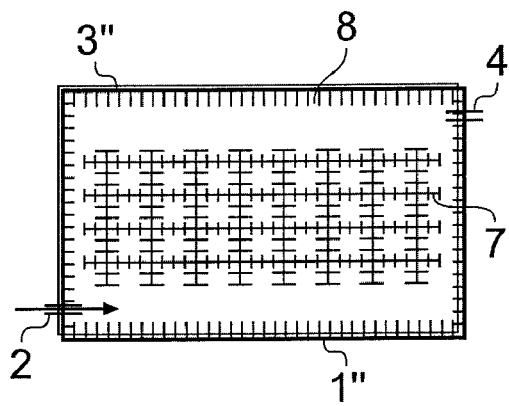
Figure 10:
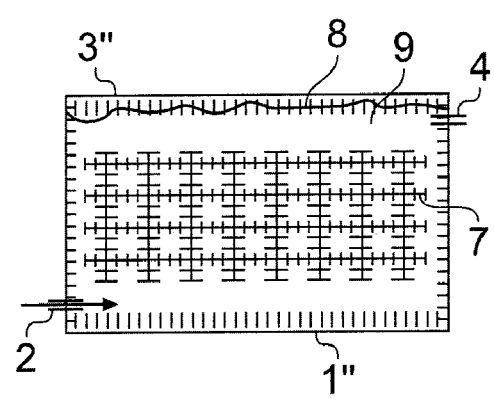

The present invention will now be described by way of example only and with reference to the accompanying figures in which:

FIG. 1: illustrates an empty mould according to one aspect of the invention;

FIG. 2: illustrates a mould and preform;

FIG. 3: illustrates the preform inside the mould;

FIG. 4: illustrates the closed mould tool;

FIG. 5: illustrates a catalyst introduced into the mould;

FIG. 6: illustrates the mould with the catalyst drained;

FIG. 7: illustrates the mould tool being heated;

FIG. 8: illustrates a carbonaceous gas being introduced into the mould tool;

FIG. 9: illustrates heating of the mould tool;

FIG. 10: illustrates the resulting matrix in the mould tool; and

Figure 11:
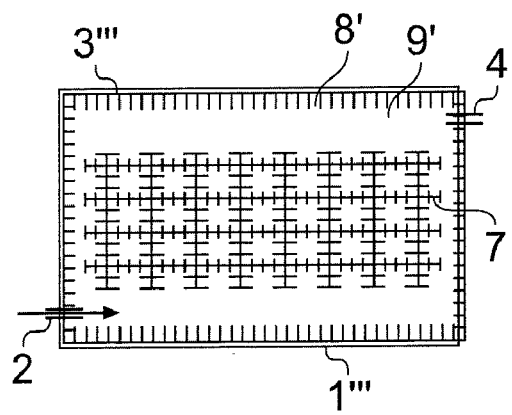

FIG. 11: illustrates the mould being heated and matrix being cured.

While the present example is described in the context of a resin-transfer mould, the invention may be used with essentially any forming environment configuration which is amenable to resin-transfer moulding. The preferred mould would conventionally be a metallic mould, although other specific mould materials may be possible. In one embodiment of the invention, a carbon preform, preferably a dry-fibre preform such as an open-weave carbon fibre fabric or other three-dimensional dry fibre carbon fibre structure, is loaded into a closed mould (see FIGS. 1 to 4).

After sealing or closing (FIG. 3), the mould tool is filled with a liquid solvent carrying a catalyst material in solution or suspension (see FIG. 5). This substance is preferably a metallic catalyst chosen to provide initiating sites for carbon nanotube growth.

After a suitable time, the liquid solvent is drained. This process deposits a residue of catalyst material on the carbon preform fibres and/or the mould tool surfaces as shown in FIG. 6.

The mould tool is then heated and a carbonaceous gas introduced (see FIGS. 7 and 8). Under specific conditions heating the carbonaceous gas causes an array of carbon nanotubes to be grown on the surface of the preform and/or mould tool surfaces at the catalyst sites (see FIG. 9). Generally, under these conditions, carbon nanotubes would be grown on both the preform structure and the mould interior wall. If the carbon nanotubes are grown at an appropriate concentration, inter-nanotube van de Waals interactions may desirably result in the carbon nanotubes being grown with a self-aligned geometry.

The carbonaceous gas environment is then removed by flushing the mould tool with an inert gas. Liquid resin material is then introduced into the mould (see FIG. 10) as for conventional resin transfer moulding.

By a process of capillary action, the liquid resin is wicked into the carbon nanotube network aiding wetting and infiltration of the preform.

According to the resulting structure, carbon nanotubes would not only be present on both the carbon fibre perform, but also the mould tool walls, providing reinforcement in regions which would otherwise be considered as 'resin-rich'. Once the resin has infiltrated, the mould is heated in a conventional manner to cure the component, and then de-moulded (see FIG. 11).

The finished component would thus contain a significant degree of 'out-of-plane' reinforcement and a dispersed and locally aligned array of carbon nanotubes, providing a network of 'nano crack stoppers'. It is envisaged that a composite structure made according to this technique would have beneficial isotropic stress absorption characteristics with increased toughness in regions normally considered resin-rich and hence lacking durability.

Although the invention has been described by way of example and with reference to particular embodiments it is to be understood that modification and/or improvements may be made without departing from the scope and spirit of the invention. For example, the resin infusion process contemplates other liquid resin processes—resin film infusion, multi-viscosity infusion and the like.

Where in the foregoing description reference has been made to integers or elements having known equivalents, then such equivalents are herein incorporated as if individually set forth.

The invention claimed is:

1. A method of fabricating a composite component comprising the steps of:
loading a preform into a component forming environment, filling the forming environment with a solvent carrying a catalyst material in solution or suspension, draining the solvent from the forming environment thereby leaving a residue of the catalyst material on the preform and/or the interior surface of the forming environment, heating the forming environment and subsequently or concurrently introducing a carbonaceous gas under such conditions as to grow a carbon nanotube structure on the preform and/or the forming environment surfaces, removing the carbonaceous gas, and introducing a liquid resin material into the forming environment whereby the resin disperses through the preform and carbon nanotube structure thereby forming the finished composite once the resin is cured or set.

2. A method as claimed in claim 1 wherein the forming environment is a mould, a vacuum bag resin-transfer mould assembly or other constraining environment which is capable of being used for a resin-transfer moulding process.

3. A method as claimed in claim 1 wherein the forming environment is a metallic mould.

4. A method as claimed in claim 1 wherein the catalyst is a metallic catalyst material in solution or suspension.

5. A method as claimed in claim 1 wherein the preform is a carbon-fibre preform structure that is arranged to allow the carbon nanotube structure to be constituted or deposited within the interstitial structure of the carbon fibre preform structure or on the outside surface of the carbon fibres.

6. A method as claimed in claim 1 wherein the carbonaceous gas is removed by flushing the mould with an inert gas.

7. A method as claimed in claim 1 wherein the resin is introduced into the preform carbon nanotube structure by resin transfer molding.

8. A method as claimed in claim 1, wherein heating the forming environment and subsequently or concurrently introducing a carbonaceous gas are under such conditions as to grow a carbon nanotube structure on the preform and the forming environment surfaces.

9. A method as claimed in claim 1, wherein heating the forming environment and subsequently or concurrently introducing a carbonaceous gas are under such conditions as to grow a carbon nanotube structure on the preform.

10. A method as claimed in claim 1, wherein heating the forming environment and subsequently or concurrently introducing a carbonaceous gas are under such conditions as to grow a carbon nanotube structure on the forming environment surfaces.

* * * * *